United States Patent
Sjoblom

(10) Patent No.: US 8,031,593 B2
(45) Date of Patent: Oct. 4, 2011

(54) CONTROLLED DATA NETWORK ERROR RECOVERY

(75) Inventor: Kai Sjoblom, Espoo (FI)

(73) Assignee: Nokia Corporation, Espoo (FI)

( * ) Notice: Subject to any disclaimer, the term of this patent is extended or adjusted under 35 U.S.C. 154(b) by 362 days.

(21) Appl. No.: 12/166,375

(22) Filed: Jul. 2, 2008

(65) Prior Publication Data

US 2008/0263424 A1     Oct. 23, 2008

Related U.S. Application Data

(63) Continuation of application No. 09/903,863, filed on Jul. 13, 2001, now Pat. No. 7,417,948, which is a continuation of application No. PCT/FI00/03036, filed on Jan. 18, 2000.

(30) Foreign Application Priority Data

Jan. 19, 1999   (FI) .......................... 990102

(51) Int. Cl.
*G01R 31/08* (2006.01)

(52) U.S. Cl. ........ 370/229; 370/230; 370/235; 370/241; 370/394; 370/748

(58) Field of Classification Search .......... 370/229, 370/230, 235, 241, 242, 244, 248, 250, 394, 370/390, 474, 748, 747

See application file for complete search history.

(56) References Cited

U.S. PATENT DOCUMENTS

| | | | |
|---|---|---|---|
| 4,439,859 A | | 3/1984 | Donnan |
| 4,638,477 A | * | 1/1987 | Okada et al. .................. 370/400 |
| 4,712,214 A | | 12/1987 | Meltzer et al. |
| 5,151,899 A | | 9/1992 | Thomas et al. |
| 5,245,616 A | * | 9/1993 | Olson ........................... 714/748 |
| 5,347,269 A | * | 9/1994 | Vanden Heuvel et al. ... 340/7.56 |
| 5,384,565 A | * | 1/1995 | Cannon ........................ 340/7.52 |
| 5,394,436 A | * | 2/1995 | Meier et al. .................... 375/132 |
| 5,444,718 A | * | 8/1995 | Ejzak et al. .................... 714/748 |
| 5,469,433 A | | 11/1995 | McAuley |
| 5,517,622 A | * | 5/1996 | Ivanoff et al. ................. 709/232 |
| 5,610,595 A | | 3/1997 | Garrabrant et al. |
| 5,664,091 A | | 9/1997 | Keen |
| 5,678,007 A | * | 10/1997 | Hurvig .......................... 709/227 |
| 5,799,012 A | * | 8/1998 | Ayerst et al. .................. 370/336 |
| 5,848,227 A | * | 12/1998 | Sheu ................................. 714/4 |

(Continued)

FOREIGN PATENT DOCUMENTS

JP      6208408      7/1994

(Continued)

OTHER PUBLICATIONS

Decision of Appeal of the Japanese Patent Office, Sep. 2, 2005.

*Primary Examiner* — Ayaz Sheikh
*Assistant Examiner* — Andrew C Lee
(74) *Attorney, Agent, or Firm* — Harrington & Smith

(57) ABSTRACT

A method, a system and network nodes use an indication of possible duplicates of units, so that these units can be handled differently than other units. The unit is indicated to be a possible duplicate to the entity to which it is resent because no response was received from the entity it was sent to.

12 Claims, 3 Drawing Sheets

U.S. PATENT DOCUMENTS

| | | | |
|---|---|---|---|
| 5,856,972 A * | 1/1999 | Riley et al. | 370/389 |
| 5,901,138 A * | 5/1999 | Bader et al. | 370/229 |
| 5,953,319 A * | 9/1999 | Dutta et al. | 370/238 |
| 5,974,028 A * | 10/1999 | Ramakrishnan | 370/229 |
| 5,999,286 A * | 12/1999 | Venkatesan | 398/5 |
| 6,058,106 A | 5/2000 | Cudak et al. | |
| 6,067,444 A * | 5/2000 | Cannon et al. | 340/7.44 |
| 6,106,545 A | 8/2000 | Egan | |
| 6,215,765 B1 * | 4/2001 | McAllister et al. | 370/217 |
| 6,343,067 B1 * | 1/2002 | Drottar et al. | 370/231 |
| 6,381,241 B1 * | 4/2002 | Ghirnikar et al. | 370/394 |
| 6,545,981 B1 * | 4/2003 | Garcia et al. | 370/242 |

FOREIGN PATENT DOCUMENTS

| | | |
|---|---|---|
| JP | 7221791 | 8/1995 |
| JP | 7336335 | 12/1995 |
| JP | 9247209 | 9/1997 |
| JP | 10023017 | 1/1998 |
| JP | 10173660 | 6/1998 |
| JP | 200013537 | 1/2000 |
| WO | 9843445 | 10/1998 |
| WO | 9858469 | 12/1998 |

* cited by examiner

CONTROLLED DATA NETWORK ERROR RECOVERY

This application is a continuation of U.S. patent application Ser. No. 09/903,863, filed on Jul. 13, 2001, which is a continuation of International Application PCT/FI00/00036 filed Jan. 18, 2000, which, in turn, relies for priority upon Finnish Application No. 990102, filed on Jan. 19, 1999, the contents of all of which are hereby incorporated by reference in their entireties.

BACKGROUND

The present invention relates to a method and equipment for transmission both in fixed networks and mobile networks, e.g., GPRS backbone networks and W-CDMA backbone networks.

In packet-switched network systems a mechanism called a sliding window is used to control the flow of packets across a data link. As each packet is transmitted, an upper window edge UWE is incremented by unity. Similarly, as each packet is acknowledged, a lower window edge LWE is incremented by unity/acknowledged packet. The sending of new packets is stopped, when the difference between the UWE and LWE becomes equal to the size of the send window. Then the sending node retries to send these sent but not acknowledged packets to the same receiving node. The sending node is a packet data transmission node, which can generate packets and transfer packets other nodes have generated. If the receiving node then receives the resent packet(s) correctly, it can determine if a received packet is a valid transmitted packet or a duplicate in this simple case where only two nodes are involved. Determining is usually done by comparing the sequence number of the received packet with the sequence numbers of successfully delivered packets. Normally the sequence number is inserted into each packet by the sending node.

A problem with the current solution arises when the receiving node is "dead" for some time. In real live environments several kinds of network failures may occur or data transmitting elements may go down due to a network element failure. When that happens, the resending of packets to the same node also fails. Then the sending node reroutes the transmission and sends the packet (or packets) to another node via which it can route packets to the end system. However, it is possible that the first node received that packet (or packets) and has sent it (them) forward before the failure. The sending node does not know when the failure happened. It does not know whether the failure happened when the packet was sent first time or when the packet was received or whether only the response (acknowledgement) got lost. Therefore, duplicates are sent to the end system. The end system has to check for every packet it receives whether it is a duplicate, for example in order not to bill a customer twice. One possible way to solve this problem is not to send duplicates, but then important information may be lost.

The same problems are encountered in systems using frames, packets or any other resendable units. A frame usually comprises a protocol-related header and payload data. An empty frame is a frame with no payload data.

SUMMARY

The object of the invention is to overcome the problems stated above. The object of the invention is achieved with a method, a system and network nodes which are characterized by what is disclosed in the independent claims. The preferred embodiments of the invention are set forth in the dependent claims.

The invention is based on indicating that a unit is possibly a duplicate of another unit which is resent because no response was received from the entity it was sent to.

The advantage of the invention is that possible duplicates are indicated, so that the system can handle these units differently than other units. For example, the end system or some other system does not need to check every unit to see whether it is a duplicate. This minimizes the load in the system.

In one embodiment of the invention the sending entity is also indicated. The advantage of this embodiment is that it is possible to use one and the same receiving entity as an intermediate storage for different sending entities, since the units can be identified by sending unit identity and sequence number. Therefore, they cannot be mixed up with other units having the same sequence number in the receiving entity and the network operation. A further advantage is that network maintenance does not need to make sure that two sending entities do not use the same receiving entity as the intermediate storage.

In one embodiment of the invention, the unit indicated to be a possible duplicate unit is sent forward from the second entity only after the sender has given instructions to send. Before giving instructions, the sender has checked from the first entity whether it has got the packet. The advantage of this embodiment is that the duplicate unit is not sent in vain in the network and thus the network load is minimized. Another advantage of this embodiment is that there is no risk of getting duplicates of units because of a communication failure between the sending node and receiving entity. Yet another advantage of this embodiment is that the load caused by cross-checking of duplicates in a border area (e.g., a month has changed in the billing system) can be avoided.

In one embodiment of the invention, the possibility that a unit is a duplicate is checked in the end system only when the received unit has been indicated to be a possible duplicate. The advantage of this embodiment is that the duplicate checking is not done in vain and the end systems can be made more simple. Besides, the units arrive at the receiving end in such a manner that it is possible to re-establish their order.

BRIEF DESCRIPTION OF THE DRAWINGS

In the following, the invention will be described in greater detail by means of preferred embodiments and with reference to the accompanying drawings, in which.

DETAILED DESCRIPTION

The present invention is suitable for use both in fixed communications systems and in mobile communications systems. The invention is particularly suitable for use in implementing the General Packet Radio Service (GPRS) in the pan-European digital mobile communications system GSM (Global System for Mobile Communications) or corresponding mobile communications systems, such as DCS1800 and PCS (Personal Communication System). The invention is also suitable for third-generation mobile systems, such as Universal Mobile Communication System (UMTS) and Future Public Land Mobile Telecommunication System (FPLMTS) later renamed as IMT-2000 (International Mobile Telecommunication 2000), which at present are being developed. The present invention may be used e.g., in handovers when frames are also resent to the target network entity.

The present invention can be implemented in existing network nodes. They all have processors and memory with which the inventive functionality described below may be implemented. In some embodiments, some extra memory may be needed. The functions described below may be located in one network element or some of them may be in one element and the others in other elements regardless of how they are located in the examples used to illustrate the invention. Transmitting nodes are also called intermediate nodes. Since the sending illustrated e.g., in FIGS. 1 to 4 may be an internal exchange of information, nodes are also called entities. The term 'node' as used herein should be understood to generally refer to any network element or functionality which handles the units.

In the following description, the term 'packet' is used for the sake of clarity. The term 'packet' should be understood to also mean any other resendable unit, e.g., a frame. Frames are used e.g., in the radio link protocol. In the following, the invention is described using two intermediate entities for the sake of clarity yet without limiting the invention to that kind of solutions. It is even possible to implement the invention in systems where only one receiving node exists and the sending node cannot reroute resendable units when it has enough memory. The preferable embodiments have, however, at least two alternative directions to send these resendable units from the sending node.

In the following description, it is assumed for the sake of clarity, that a packet generating node has difficulty with a first node via which it tries to send one packet to an exit node, but it has no difficulty with a second node. The end system, e.g., a billing system, is described here to be one entity, although the end system may comprise several different entities. The structure of the end system is not important to the invention. It is also assumed, for the sake of clarity, that only one packet is sent. A person skilled in the art knows how to deal with a plurality of packets being possible duplicates, that is, how to handle e.g., a window whose size is bigger than one.

Figure 1:
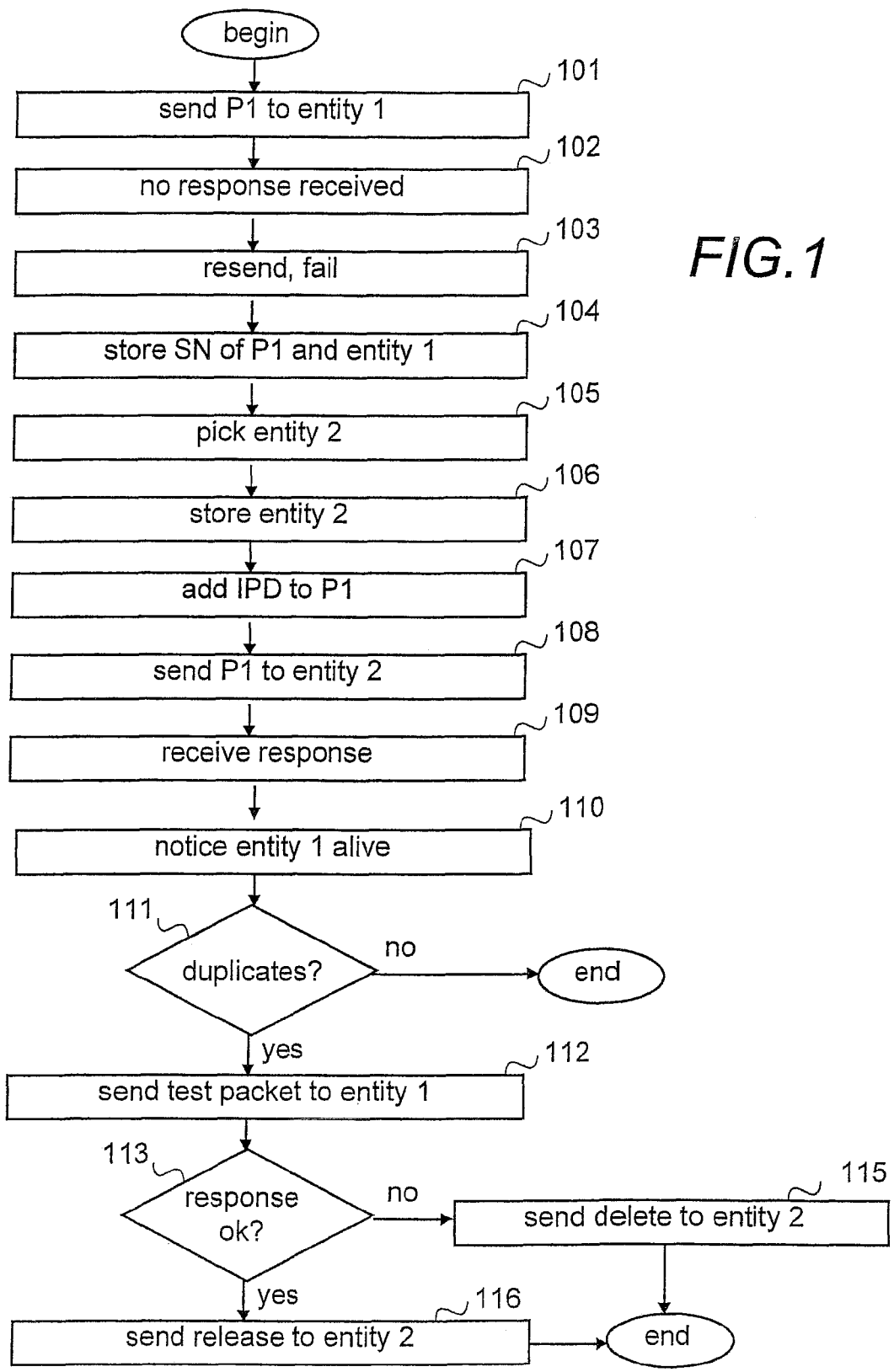
FIG. 1 is a flow chart illustrating the functionality of a sending entity in an embodiment.

FIG. 1 illustrates the functionality of a sending node (entity) in the first preferred embodiment of the present invention. The sending node can be a packet generating node (entity) or an intermediate node sending the packet further ahead. In step 101, the node sends a packet P1 to an entity 1. The entity 1 may be the primary peer. The packet P1 has a sequence number by which it can be identified within a window size. The window size must be smaller than the maximum sequence number in order to identify the packet properly (unless the window size is one). The node discovers in step 102 that no response is received. In step 103, it tries to resend the packet P1 to the entity 1, but fails. In another embodiment, an IPD is added to the packet P1 before resending it in step 103. The IPD is an indication indicating a possible duplicate of the packet P1. Resend means here the same as a retry send. Resend is repeated a predefined number of times after time-outs of given lengths. Then the node stores into its memory the sequence number SN of the packet P1 and the entity 1 in step 104. This is how it knows where it sent the packet P1 without receiving a response. Then, in step 105, the node picks from its priority list an entity whose priority is smaller but closest to the priority of the entity 1. Picking means that the sending node selects according to predetermined rules the next entity (or its address) to which it will try to send next. Here, that entity is the entity 2. Next, the node stores in step 106 into its memory the entity 2 so that it knows that it has first tried to send the packet P1 to the entity 1 and after that to the entity 2. Then it adds an IPD to the packet P1 in step 107. Next, the node sends in step 108 the packet P1 to the entity 2 and receives a positive response from it in step 109. A positive response means here an acknowledgement of receiving the packet P1.

If a positive response is not received from the entity 2, the node can repeat the steps 105 to 109 until a positive response is received. A positive response means that the packet P1 was received successfully. As long as the entity 1 is "dead", the packets may be sent via the entity 2.

Then in step 110 the node notices that the entity 1 is again "alive" and that packets can be sent to it again. How the node notices that the entity 1 is alive is described later in more detail with alternative examples with reference to FIG. 5. In step 111, the node checks from its memory, whether there are packets sent to the entity 1, which may have a duplicate. That is, it checks e.g., whether there are packets in its buffer for unconfirmed packets. If there are no packets, the node continues normally by sending new packets either via the entity 1 or entity 2 depending of the configuration. In this example, the serving node finds out that the packet P1 is a possible duplicate and sends a test packet to the entity 1 in step 112. This test packet is an empty packet with the sequence number of P1.

After that, the node receives a response from the entity 1 and checks in step 113 if the response is ok. If the response is ok, the entity 1 never got the original packet P1 or did not succeed in sending it. The response is ok, if it is e.g., a request accepted message. Therefore, there are no duplicates and the node sends in step 114 to the entity 2 a message indicating that the entity 2 can release the packet P1. In other words, the node allows the entity 2 to send the packet P1 ahead. If in step 113 the response indicates that the entity 1 has already received that packet, the node sends in step 115 to the entity 2 a message indicating that the entity 2 can delete the packet P1 from its memory. A cancel message can also be used for the same purpose. In other words, the node 2 is not allowed to send the packet P1 ahead. The packet P1 is identified by the sequence number in the message sent either in step 114 or 115. It is also possible to use an identification of the entity 1 in the messages sent in steps 108, 114 and 115. The message which indicates that the response is not ok may be a request already fulfilled, for example. The sending of new packets to the entity 1 is preferably done after instructions on all unconfirmed packets have been sent.

In some other embodiments, instead of the storing done in steps 104 and 105, buffering can be used, but then there is a risk of losing information due to a failure.

In some other embodiments, the whole packet P1 may be saved in step 104 and sent as a test packet in step 112. It is also possible to save the packet only in the entity 2 and, when sending the test packet, the sending node first asks the entity 2 to send a copy of it. Depending on the application in these embodiments, the message sent in step 114 may only allow the release of the packets which were not sent as test packets and the test packets are deleted because their sequence numbers were not in the release message.

If the resend does not fail in step 103, further packets are sent normally to the entity 1.

Figure 2:
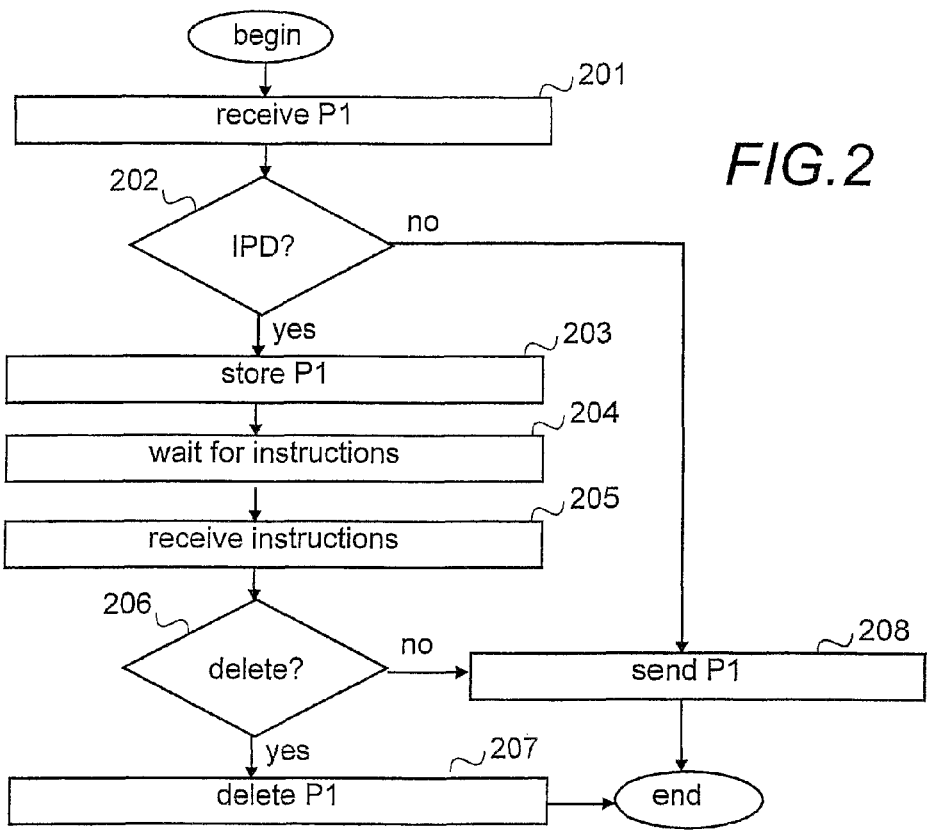
FIG. 2 is a flow chart illustrating the functionality of a receiving entity in an embodiment.

FIG. 2 illustrates the functionality of a packet receiving entity in the first preferred embodiment. The receiving entity is assumed to be an intermediate entity. The receiving entity RE receives in step 201 a packet P1 from a sending entity SE. The RE checks in step 202 whether there is an IPD (indication of possible duplicate) in the packet P1. If there is, the RE stores in step 203 the packet P1 in order to wait for instructions from the SE. It may also store the packet P1 with the information that it received it from the SE and/or an identification of the first entity if indicated by the SE. In step 204, the RE waits for instructions. During this waiting, it may transmit other packets normally. In step 205, the RE receives instructions concerning the packet P1 from the SE. (It identifies the packet P1 e.g., by the sequence number.) In step 206, it checks if the instruction indicates a delete or a cancel. If it is a cancelling or deleting instruction, the RE deletes from its memory the packet P1 in step 207. If the instruction did not indicate a delete/cancel but a release, the RE sends the packet P1 ahead normally in step 208. In the first preferred embodiment, the packet P1 still has the IPD with the added information that it is released by an instruction from the sending entity, so that e.g., the end system may still check whether it has got it earlier, but the other intermediate nodes do not store it to wait instructions since it has this added information with the IPD. In some other embodiments, the RE may take the IPD away from the packet. Then no other checking of duplicates is done in vain. In embodiments which use maximum storing time before delivery, it is very advantageous to have the IPD in the packet, because the packet may be released because the length of the storing time of the packet reaches the maximum storing time.

If there is no IPD in step 202, the RE sends the packet P1 ahead normally in step 208.

Figure 3:
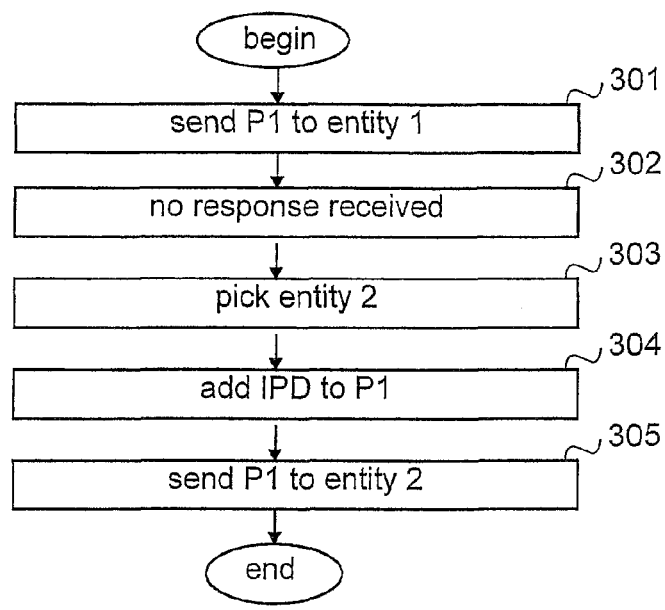
FIG. 3 is a flow chart illustrating the functionality of a sending entity in another embodiment.

FIG. 3 illustrates the functionality of a sending node (entity) in the second preferred embodiment of the present invention. In step 301, the node sends a packet P1 to an entity 1. The node discovers in step 302 that no response has been received. Then, in step 303 the node picks from its address list an address of the next entity, entity 2. Then it adds an IPD (an indication indicating possible duplicate of the packet P1) to the packet P1 in step 304 and sends in step 305 the packet P1 to the entity 2. In some other embodiments, step 303 may be similar to step 105 of FIG. 1 and/or step 103 of FIG. 1 may be done between steps 302 and 303. It is assumed that after step 305 a positive acknowledgement (response) is received. If not, then the steps 303 to 305 are repeated until a positive response is received.

Figure 4:
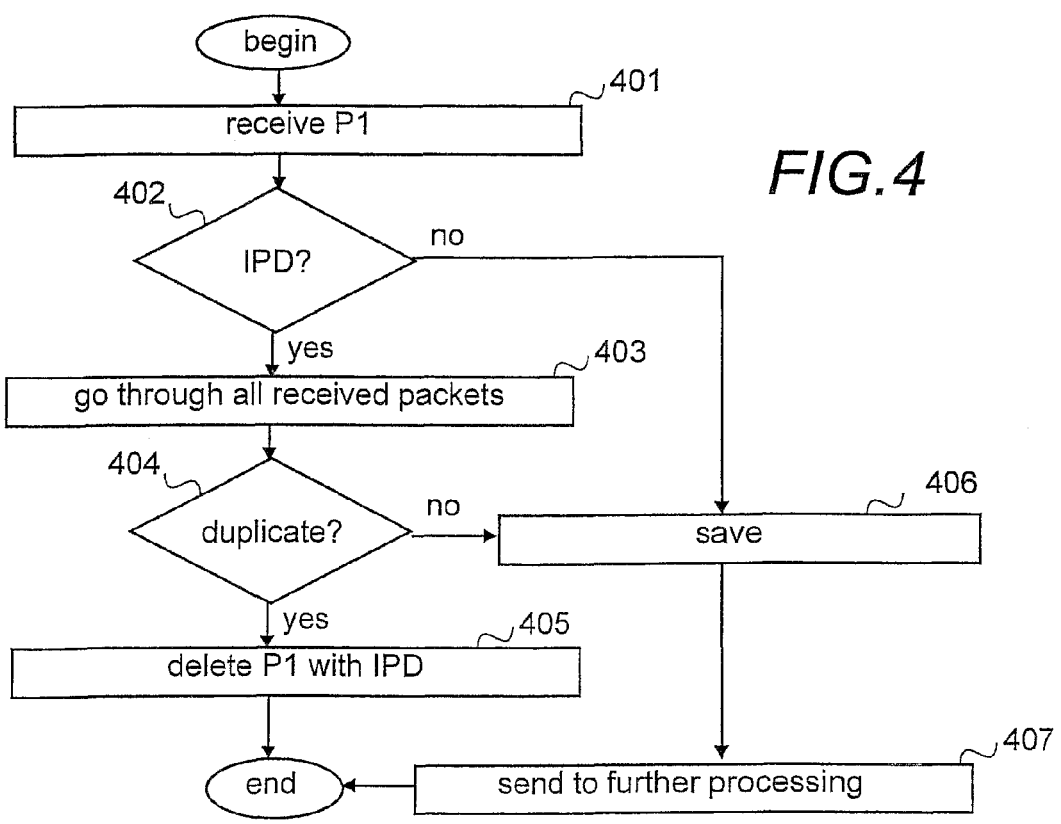
FIG. 4 is a flow chart illustrating the functionality of an end system according to an embodiment.

The packet P1 is sent ahead to the intermediate entities (nodes) in the second preferred embodiment until it reaches the end system. FIG. 4 illustrates the functionality of an end system in the second preferred embodiment of the invention. In embodiments having only one receiving node, the functionality described in FIG. 4 may be implemented into it. When an embodiment related to the first embodiment of the invention is used, where the receiving entity does not remove the IPD when sending a packet forward, the end system does not need to function as illustrated here in FIG. 4.

Referring to FIG. 4, the end system ES receives a packet P1 in step 401 and checks in step 402 whether there is an IPD (indication of possible duplicate) in the packet P1. If there is, it goes in step 403 through all the packets it has received in order to find out whether it has already received this packet P1. If the ES finds out in step 404 that the packet P1 is a duplicate, it deletes in step 405 the packet P1 with the IPD it received in step 401. If the ES finds out in step 404 that it has not received the packet P1, in other words, that the packet P1 is not a duplicate, it saves in step 406 the packet P1 or at least enough information in order to do a duplicate check, if needed. Then it sends the packet P1 or its information for further processing according to normal procedures depending on the application. If in step 402 no IPD is found, the ES continues from step 406.

The first preferred embodiment is very well suited for applications where the order of packets in the end system is not important, like billing systems or email. Its advantage is that the network is not loaded unnecessarily by sending duplicates through the whole network. The second preferred embodiment may also be used in systems where the order of the packets is of some importance, like in connection with still pictures or photos.

The steps have not been set out in absolute time sequence in FIGS. 1, 2, 3 and 4. Some of the steps described above may take place simultaneously or in a different order or some of the steps can be skipped over, e.g., steps 110 to 115. It is also possible to add new steps not shown in the figures, for example in FIG. 1 between steps 109 and 110 new packets can normally be sent to the entity 2 without marking them as duplicates. It is also possible to check before step 203 in FIG. 2 whether the IPD includes additional information that the packet is released by an instruction from the sending entity, and if there is, the process continues from step 208, otherwise from step 203. Another possibility is to combine steps in the figures when making a new embodiment. For example, it is possible to further process the packet in step 406 by taking the IPD away and sending the packet ahead. It is essential that the possibility of the packet being a duplicate is indicated. The indication can be done e.g., by adding it to the packet header or to the payload or to the file name when file protocols are used or by sending a message indicating that the following packet is a possible duplicate. The indication may also be in another frame. It is also possible to indicate the duplicate in the message the unit is sent with, e.g., 'send packet' means that the packet is not a duplicate whereas 'send possibly duplicated packet' indicates a possible duplicate. The indication may even go via another link. It is not important how this indication is done, the essential thing is that it is done. The messages may include more information than what is stated above. The names of the messages may differ from those set out above or the indications or the instructions according to the invention may be sent in other messages than those stated above. For example, 'delete' may be 'cancel' or the IPD may be called a mark of a potential/possible duplicate MPD.

In the above, storing means that the information is stored so that it is not lost e.g., during a restart. In other words, it is stored to a non-volatile memory. The information may be stored in the sending unit and/or any other active entity with which the sending unit has a connection. That entity may be the receiving entity or a totally different entity. In the above, a sequence number is used to identify the packet. Other identification may also be used. In a preferred embodiment, the sending unit also indicates the first receiving entity when it indicates a possible duplicate. This way, the receiving entity knows whose possible duplicates it has. This is very advantageous since the same intermediate entity can store possible duplicates first sent to different nodes and yet identify them properly. It is possible to indicate the sending node and use this information for identifying purposes.

Figure 5:
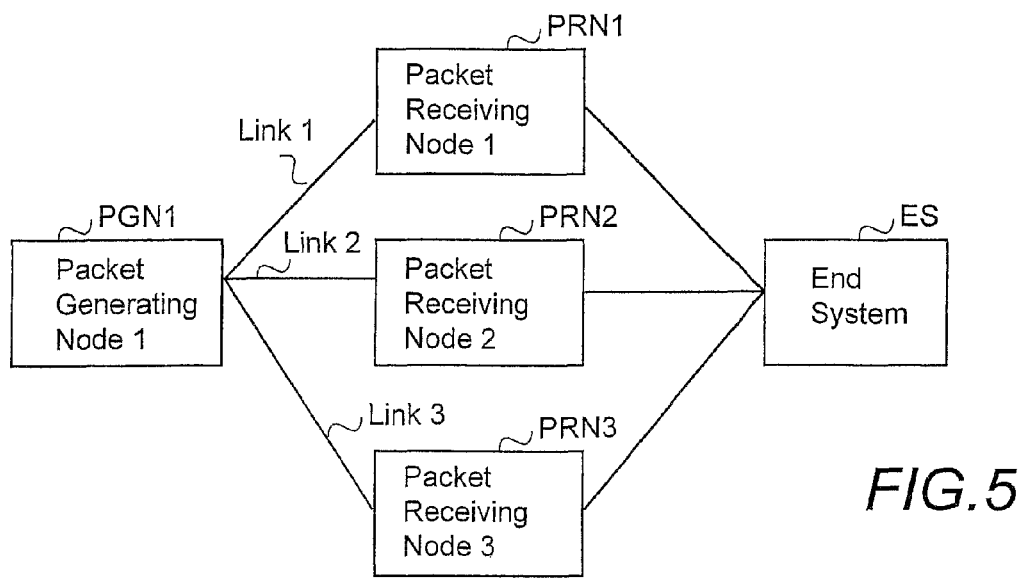
FIG. 5 illustrates one example of a system according to an embodiment.

FIG. 5 illustrates one example of a system according to the invention. For the sake of clarity, FIG. 5 has only one packet generating node PGN1, although it is possible to have a plurality of PGNs. The PGN1 has, in this illustrative example, three links: Link 1 to packet receiving node PRN1, Link 2 to packet receiving node PRN2 and Link 3 to packet receiving node PRN3. The PGN1 can send packets to the end system ES via all the packet receiving nodes. The packet receiving nodes are intermediate entities. The packets are sent ahead until they reach the end system ES. Although not illustrated in FIG. 5, there may be any number of PRNs between e.g., PRN1 and ES. If the system illustrated in FIG. 5 is a GPRS billing system, then the PGN1 may be a serving GPRS support node SGSN or a GPRS gateway support node GGSN, and packet receiving nodes may be different nodes which have a charging gateway functionality CGF. So they may also be called charging gateway nodes. The end system ES may be a billing system. The GPRS billing system with one charging gateway is described in more detail in Finnish Patent 102232. This patent is incorporated herein by reference.

Some alternative examples are described below in more detail with reference to FIG. 5. The abbreviations used are:
BS=Billing System
CDMA=Code Division Multiple Access
CDR=Call Detail Record
CGF=Charging Gateway Function
IMSI=International Mobile Subscriber Identity
GPRS=General Packet Radio Service
NE=Network Element
O&M=Operations and Maintenance
PDP=Packet Data Protocol
W-CDMA=Wideband CDMA
PGN=Packet Generating Node
PRN=Packet Receiving Node
ES=End System The application areas in the following examples are environments where it is not absolutely crucial that the packet sent from the PGNs to the ES arrives in exactly the original order, but where it is useful that the packet contents are not lost even in abnormal network link failure situations or NE failure situations. For example, charging data collection in packet-data based telecommunications systems is a very likely application area. One example of this kind of an environment is GPRS charging. In GPRS, the SGSNs and GGSNs are PGNs, the CGFs are the PRNs and the BS is the ES. Each packet transmitted between a PGN and PRN may contain one or more CDRs as payload inside the packet frame.

FIG. 5 is an architectural example of a chain of network elements, where the PGN1 sends packets towards the ES via either the PRN1, PRN2 or PRN3. The PRN1 is here assumed to be the primary choice (priority 1 PRN peer name configured to its PRN address list as the first place to attempt packet sending). The packet flow is assumed to be as follows: Packet Generating Node(s)->Packet Receiving Nodes->End System.

Both the packet receiving node and the end system have a mass memory for packets.

The initial assumptions are as follows: The topmost protocol in the communication software stack that transfers packets between the PGN and the PRNs is assumed to be a Request-Response type message-based protocol.

The packet send window size per each link from the packet generating node is smaller than the maximum sequence number (that is allowed to run over back to 0 and increase again per each packet).

In most telecommunication systems, such as those given in these examples, the mass storage devices can be assumed to maintain their information even when the network element goes down due to a software failure or lack of processing capacity in relation to the traffic load.

Possible problems which are solved here in these examples are as follows: Duplicated information (e.g., packets containing CDRs) may be generated when traffic is redirected and the packet generating node does not surely know if the redirected packets were already successfully transmitted to the packet receiving node 1 or not.

A network operator is governed by the laws and administration of the country within which it operates. The operators are audited by officials. An operator might be subjected to penalties or even lose its network operator license if it generated too big bills to its subscribers, because of duplicated CDR information.

Also, it could lose its credibility among its customers if some user data packets or CDRs related to them were either duplicated or lost.

On the other hand, operators do not want to unnecessarily lose money, so they do not want to unnecessarily cancel packets containing CDRs unless they are 100% sure the packets are duplicates.

EXAMPLES

Example A

In this example, sequence numbers are used for packets (typically in the frame of the packets) in each link from the packet generating node (PGN) to the packet receiving node (PRN). The sequence numbers are incremented by one and roll over again to 0 after e.g., 65535, but the important thing is that the maximum sequence number is bigger than the maximum receive window size of a PRN.

The packets are redirected (marked with a potential duplicate flag) to a parallel node PRN2 (or PRN3 if PRN2 is not available for some reason, etc.) in case the PRN1 fails. The PGN1 also sends to the PRN2 identification information of the PGN1, so that the PRN2 can identify these packets. This is necessary since the PRN2 can have packets marked with a potential duplicate flag also from other PGNs with the same sequence numbers.

The PRNs keep the packets marked potentially duplicate in memory buffers or a mass storage so that the information of their origin (PGN1 or PGN2 or other PGN) can also be associated with the packets. This is necessary since the sequence numbers of packets are unique at a certain moment only in each PGN-PRN communication link, but not necessarily at the same time in the whole network.

Packet generating nodes keep track per each packet receiving node, i.e. per each link, of sequence numbers of packets whose successful transmission is not certain. If the PGN1 fails to send a packet to the PRN1 and also fails in sending a possible duplicate of the packet to the PRN2, then the PGN1 tries to send the possible duplicate of the packet to another PRN, e.g., PRN3. However, there is no need to keep track of sequence numbers of the possible duplicates which the PGN tried to send to PRN2 per this link, since link-specific information is maintained on these packets in the link to the PRN1. It is, however, possible to add to the information relating to the link PRN1 that these packets were also sent to the PRN2 and PRN3.

The PGNs sense when their peer nodes, PRNs, come alive again. Either the PGNs send 'keep alive' messages to the PRNs at appropriate intervals (getting echoing response back from the PRNs if the PRNs are alive and working ok), or the PRNs (and possibly other nodes too) can inform their peer nodes (configured communication partners) always when they come alive after being non-working. Also, when a node is stopping working, e.g., when the operator wants to stop it to make a software update, the node can inform its peer nodes that it is going down and should not receive packets any more until it announces it has become alive again.

The PGNs sense what information the previously collapsed node had been able to process successfully.

The PGNs inform the secondary receiving node which packets it can send forward towards the end system.

It might also occur that at some time the PGN node goes down and its volatile memory contents are destroyed, including the buffer for sequence numbers of packets whose reception by e.g., a PRN1 was possibly not successful and which have been sent (marked as potential duplicates) to a PRN2 to wait for a later decision by the PGN. In this case, the potential duplicates might stay very long at the PRN2. Therefore, it is recommended that the PRNs either have a long enough timeout to cancel such packets themselves or the operator has tools for getting information about this kind of a situation and a tool to delete such long-waiting potential duplicates by an O&M operation from a PRN2. Another alternative is to finally allow the sending of the packets (e.g., marked as potential duplicates) towards the ES.

Example B

Similar as example A but there is a different sensing method for finding out whether the PRN1 (who had gone down and then become alive again) has already successfully handled a packet (sent by the PGN1) with a certain a sequence number. Here, the PGN1 would send a normal whole packet again to the PRN1, the only difference being that now the packet is marked a potential duplicate. This requires that the intermediate storage for whole packets resides either in the PGN1, or the whole (potentially duplicated) packet should first be fetched from the PRN2 (where it has been waiting in an intermediate storage for a final decision whether it can be sent to the ES). The PGN1 could ask the PRN2 to give a specific potentially duplicated packet back by referring to the sequence number of the packet, and after getting back the potentially duplicated packet from the PRN2, it could be resent to the PRN1. After that the PRN1 would give a response to the PGN1 (on whether it has already done the sending, i.e. processed successfully that packet or whether it got the packet "for the first time"). Then there are two possible submechanisms in case it was "new" to the PRN1: B1) the PRN1 processes such a packet towards the ES and informs the PGN1 and the PGN1 cancels the potentially duplicated packet stored as a backup in the PRN2 (or even the PGN1), or B2) the PRN1 keeps potentially duplicated packets in its intermediate memory until the PGN1 makes the selecting commands (to cancel the packet in the PRN1 and release towards the ES the potentially duplicated packet stored in the PRN2, or vice versa).

One advantage is an improved performance in the receiving end system, since either it has to do a check for duplicated packets (containing e.g., CDRs) for only the very small minority of packets that have been produced in an abnormal case of a network node or link failure and marked as potential duplicates or no packets produced are duplicated in the PGN-PRN interface even in abnormal node or link failure events.

Another advantage is that reliability increases as regards the information contents received. Yet another advantage is the reduction of possible manual-error recovery procedures.

The examples presented here do not require that the receive window sizes of the PRN in a network are the same, so the O&M events that configure the window size are easier to produce in practice, since all the receive window sizes of the PRNs need not be updated simultaneously.

It is possible to use as an intermediate storage for different PGNs one and the same PRN, since the packets are identified at least with the PGN and sequence number. Therefore, they are not mixed with other packets in the PRN and the O&M does not need to make sure that two PGNs do not use the same PRN as the intermediate storage.

Exemplary Features

1) The two sensing methods presented here in examples A and B that the PGN can use to find out whether the PRN has successfully received and processed the packets that it received before the Link 1 or the PRN became malfunctioning.

2) The buffering of the sequence numbers of packets sent from the PGN to the PRN1 associated with the not-successfully-confirmed packets sent by the PGN1. This buffer is maintained in each PGN for each PRN that the PGN is allowed to be connected to.

3) The buffering of the sequence numbers of possibly duplicated packets sent to a PRN2 to wait for a later decision (Cancel or Release) by the PGN1.

4) The similar redundancy method, but with the difference that the buffers for potential duplicates for each PGN1->PRNx reside in the PGN1 itself.

5) The idea of marking (e.g., to packet frames) the potential duplicates, allowing them to be handled differently than the other packets (e.g., to wait in some node for final confirmation on whether they are allowed to be sent to the ES or whether the packets should be cancelled, i.e. deleted). This is the only essential feature for this invention.

6) The idea of identifying the packets in the intermediate PRN by using the identification of the PGN and a sequence number.

The accompanying drawings and the description pertaining to them are only intended to illustrate the present invention. Different variations and modifications to the invention will be apparent to those skilled in the art, without departing from the scope and spirit of the invention defined in the appended claims.

What is claimed is:

1. A method, comprising:
   sending a first packet from a gateway support node to a first network entity that comprises a charging gateway function, where the first packet is comprised of a call detail record; and
   in response to determining that a response is not received from the first network entity, where the response if received would indicate that the first packet was received at the first network entity, resending the first packet as a resent packet to a second network entity that also comprises a charging gateway function, where the resent packet is marked with an indication that the response was not received from the first network entity and that the resent packet is a potential duplicate of the first sent packet in the event that the first packet was actually received by the first network entity.

2. The method of claim 1, further comprising:
   one of sending a command to the second network entity to release the resent packet and send it towards a destination, or sending a command to the second network entity to cancel the resent packet and not send it towards the destination, where the destination is a billing system associated with a general packet radio service system.

3. The method of claim 1, where the first packet is sent with a message, and where the message comprises the indication.

4. The method of claim 1, further comprising sending an empty packet to the first network entity, where the empty packet comprises a same sequence number as the first packet.

5. A method, comprising:
receiving at a first charging gateway function a message from a gateway support node, the message comprising a call detail record;
determining if the received message comprises an indication that a response was not received by the gateway support node from a second charging gateway function when the call detail record was previously sent to the second charging gateway function, where the indication indicates that the call detail record is a potential duplicate of the previously sent call detail record in the event that the previously sent call detail record was actually received by the second charging gateway function;
in response to determining that the received message does comprise the indication, storing at least the call detail record at the first charging gateway function; and
one of receiving a command from the gateway support node to release the stored call detail record and send it towards a destination, or receiving a command from the gateway support node to cancel the stored call detail record and not send it towards the destination.

6. The method of claim 5, where the destination is a billing system associated with a general packet radio service system.

7. An apparatus, comprising:
a memory; and
a processor connected to the memory, said processor configured to send a first packet from a gateway support node to a first network entity that comprises a charging gateway function, where the first packet is comprised of a call detail record; and
in response to determining that a response is not received from the first network entity, where the response if received would indicate that the first packet was received at the first network entity, to resend the first packet as a resent packet to a second network entity that also comprises a charging gateway function, where the resent packet is marked with an indication that the response was not received from the first network entity and that the resent packet is a potential duplicate of the first sent packet in the event that the first packet was actually received by the first network entity.

8. The apparatus of claim 7, where said processor is further configured to one of send a command to the second network entity to release the resent packet and send it towards a destination, or to send a command to the second network entity to cancel the resent packet and not send it towards the destination, where the destination is a billing system associated with a general packet radio service system.

9. The apparatus of claim 7, where the first packet is sent with a message, and where the message comprises the indication.

10. The apparatus of claim 7, where said processor is further configured to send an empty packet to the first network entity, where the empty packet comprises a same sequence number as the first packet.

11. An apparatus, comprising:
a memory; and
a processor connected to the memory, said processor configured to receive at a first charging gateway function a message from a gateway support node, the message comprising a call detail record;
to determine if the received message comprises an indication that a response was not received by the gateway support node from a second charging gateway function when the call detail record was previously sent to the second charging gateway function, where the indication indicates that the call detail record is a potential duplicate of the previously sent call detail record in the event that the previously sent call detail record was actually received by the second charging gateway function;
said processor further configured, in response to determining that the received message does comprise the indication, to store at least the call detail record at the first charging gateway function; and
to one of receive a command from the gateway support node to release the stored call detail record and send it towards a destination, or to receive a command from the gateway support node to cancel the stored call detail record and not send it towards the destination.

12. The apparatus of claim 11, where the destination is a billing system associated with a general packet radio service system.

* * * * *